Figure 4:
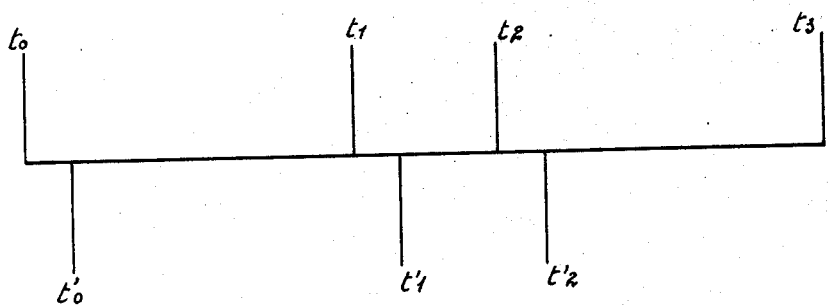

Dec. 10, 1963  J. MOULIN ET AL  3,113,631
DEVICES FOR THE MEASUREMENT OF TRANSITORY VALUES
Filed June 15, 1962  4 Sheets-Sheet 1
Fig. 1
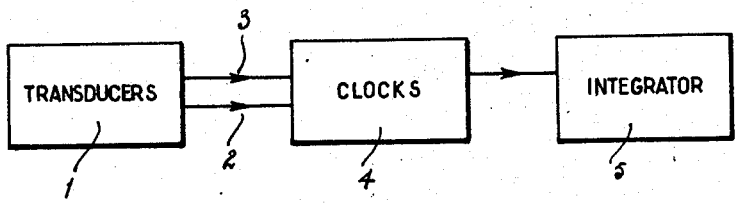
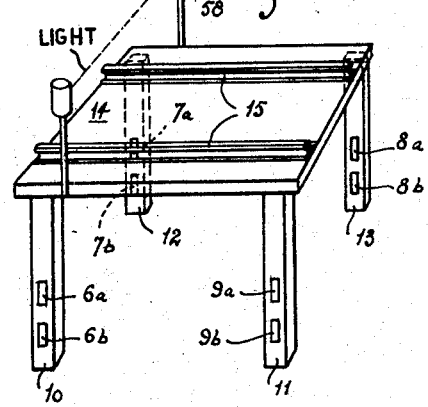
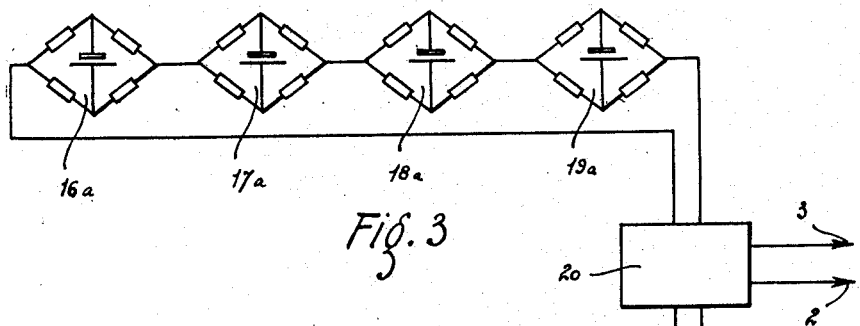
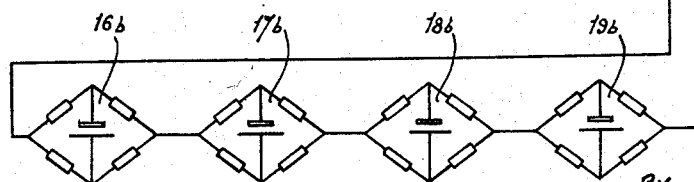
INVENTORS:
JEAN MOULIN,
GERVAIS HEGO,
MAURICE MAUTEMPS.
BY Irvin S. Thompson
ATTORNEY

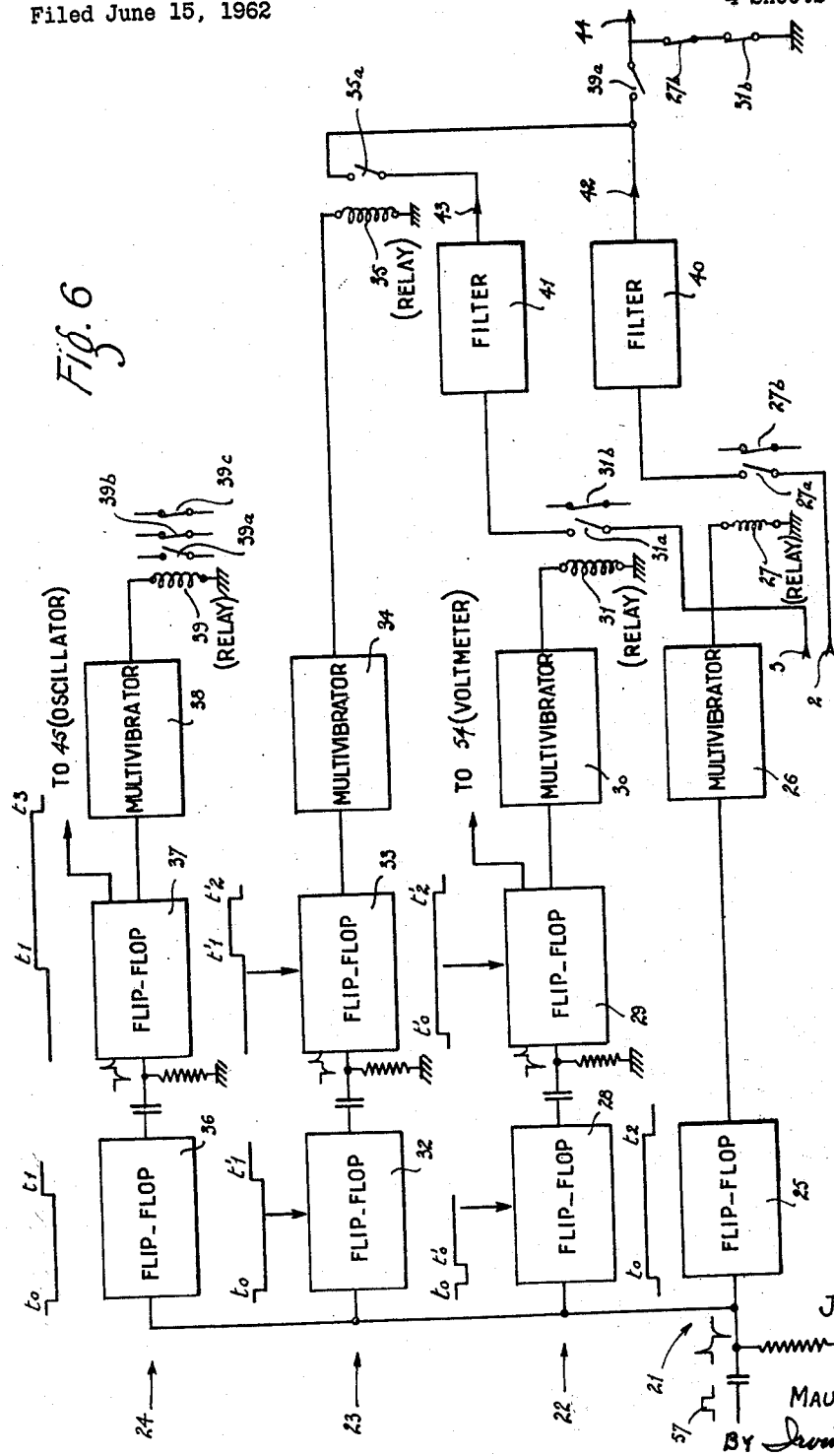

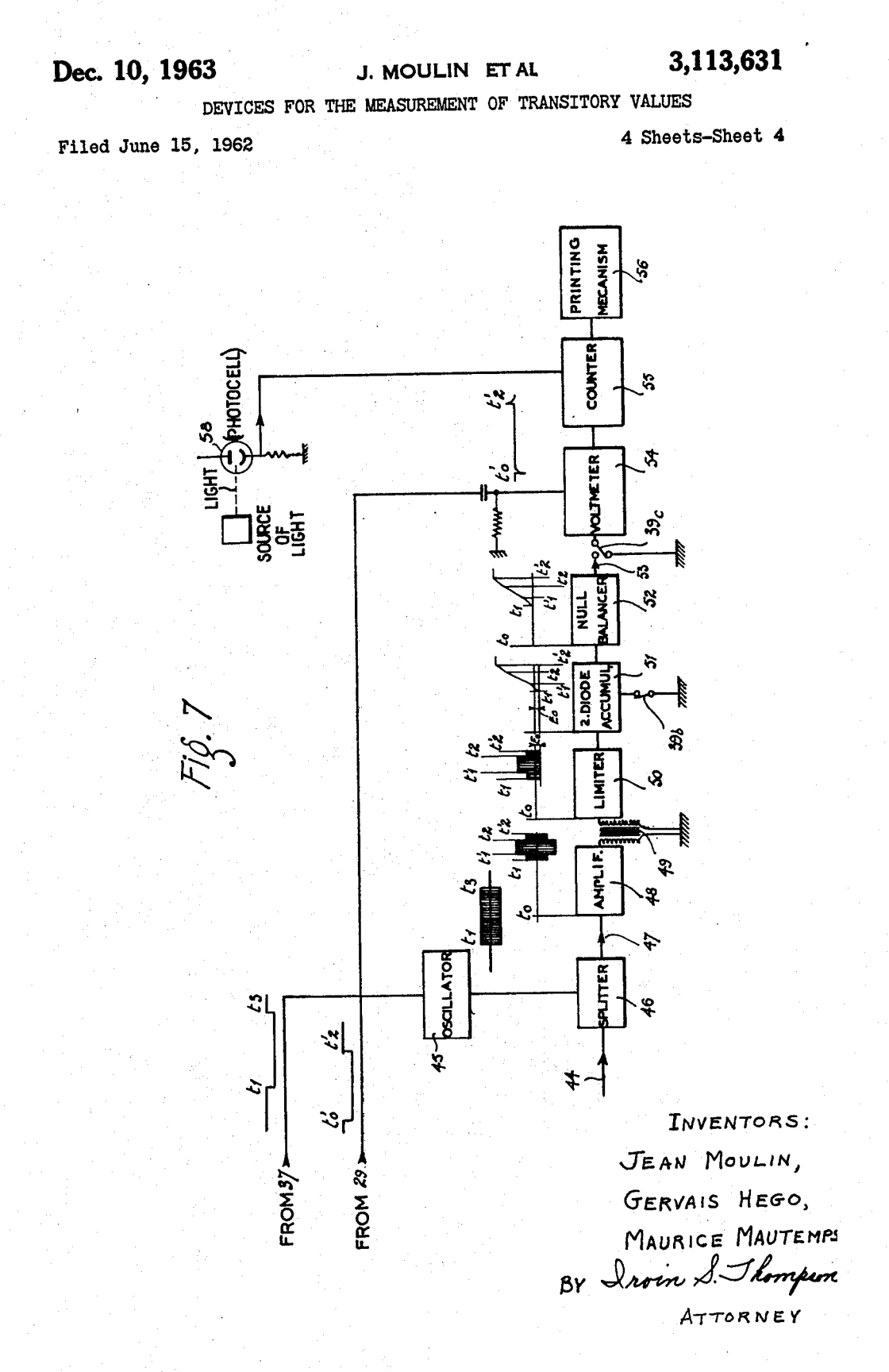

Dec. 10, 1963   J. MOULIN ET AL   3,113,631
DEVICES FOR THE MEASUREMENT OF TRANSITORY VALUES
Filed June 15, 1962   4 Sheets-Sheet 4

INVENTORS:
JEAN MOULIN,
GERVAIS HEGO,
MAURICE MAUTEMPS
BY Irvin S. Thompson
ATTORNEY United States Patent Office 3,113,631
Patented Dec. 10, 1963

3,113,631
DEVICES FOR THE MEASUREMENT OF
TRANSITORY VALUES
Jean Moulin, Paris, Gervais Hego, Sevran, and Maurice
Mautemps, Paris, France, assignors to Materiel Industriel, S.A., Lausanne, Switzerland, a corporation of
Switzerland
Filed June 15, 1962, Ser. No. 202,859
8 Claims. (Cl. 177—3)

This invention relates to devices for the measurement of transitory values.

The invention relates to a device which renders it possible to perform accurate measurements of a physical value influenced by oscillatory disturbances, and more specifically of a value whereof the existence is brief or transient and whereof the disturbance in amplitude appreciable in comparison with that of the main value have an uncertain phase and are of indeterminate frequency, although located within a known range.

Various mechanical, pneumatic or electrical methods are known, which despite said disturbances, provide an approximate measurement of the main value, provided that said disturbed value is previously converted into appropriate analogical data.

In said methods, more or less intensive filtering is applied initially to the overall information in order to obtain maximum attenuation of the amplitude of the alternate interference value. An idle period is provided for thereafter, calculated from the start of the filtration, preceding the measurement as such, in such manner as to assure adequate calming of the transitory phenomena due to filtering.

Two principal methods, which are dissimilar moreover as far as their results are concerned, may then be applied.

After said filtering action and after said idle period has elapsed, one simply measures the value of the signal obtained. The maximum error inherent in this method is evidently substantial; it may reach the peak value of the waveform remaining after filtering.

Another method consists of producing an integration of the signal during an appropriate period, or else of taking the mean of several consecutive measurements. The theoretical and practical results are evidently more satisfactory in the last case, than those of simple measurement. In several cases however, this integration method still produces inadequate results. The minimum error attainable by means of this method cannot in point of fact be depressed below a certain threshold value, owing to the opposing action of filtering on the amplitude of the forced oscillations present in the initially available information and on the duration of the transitory state caused in the filter by the self-same forced oscillations of uncertain phase.

The aim of the present invention is to create a device which renders it possible to reduce this error still further.

The device according to the invention essentially comprises, in combination, transducers adapted to convert a transient value of generally physical nature, influenced by oscillatory interference of mean frequency lying within a range of known frequencies, into two initial and identical items of information, having a function of analogy to the overall value which is to be measured and each formed by a continuous main signal and an alternate interference signal, as well as a first series of "clocks" which are adapted, according to a definite cycle, initially to feed one of said initial two items of information to a low-pass filter in order to weaken the interference signal and then, as soon as the attenuation of the transitory state induced by the application of this interference signal to said filter is sufficient, to feed the signal issuing from said filter to an integrator for an integration period equal to that of the interference signal having the minimum probable frequency, whereas a second series of "clocks" is adapted to feed the second item of initial information, according to a second cycle corresponding to the first but chronologically lagged relative to said first cycle by an idle or standby interval equal to approximately one third of the integration period, firstly to a second low-pass filter identical to the preceding one, and then to the integrator already utilised, which is adapted to supply the mensuration value to an indicating instrument by the combining of the two signals and their integration in the time allotted for this purpose.

According to a preferred form of application, the nature of the signals supplied by the transducers is electrical, and the "clocks" determining the evolution of the cycles are electronic and composed of so-called flip-flops followed by "astable" multivibrators adapted to control relays for the distribution of the items of information, whereas the integrator is also electronic and in sequence comprises a modulator or coder and an amplifier of the carrier or superimposed current type, then a detector set for a threshold value and a circuit of the type known under the name of double diode accumulator and adapted to supply the measurement results to an indicating voltmeter which is preferably of the numerical type and synchronised by means of the cycles hereinabove defined.

A special application of the invention relates to the measurement of weight distribution on the axles of railway trucks passing over rail sections secured to a weighbridge. It is known, that by equipping the supports of the weighbridge with stress gauges, the latter emit an electrical signal during the period of passage of the axle which is composed of a principal tension in an analogy relationship with the weight of the truck and of an alternate interference tension originating from the unconstrained oscillations of the truck on the suspension springs.

Figure 5:
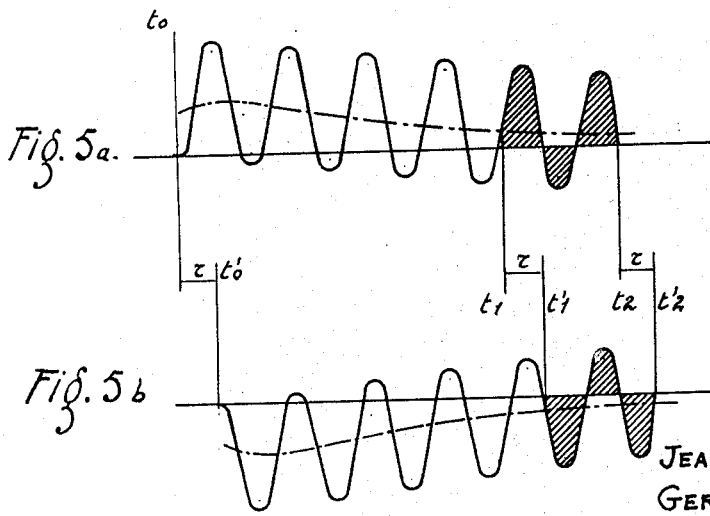

The invention will be more clearly understood from the following detailed description of one embodiment thereof, applied to the weighing of trucks in motion, which is given solely by way of example, taken in conjunction with the accompanying drawings, wherein:

FIGURE 1 shows the overall diagram of a form of embodiment of the device,

FIGURE 2 illustrates the positioning of the transducers on the supports of a weighbridge, FIGURE 3 shows two series of Wheatstone bridges comprising stress gauges, FIGURE 4 illustrates the chronological evolution of the noteworthy instants of the two cycles produced by means of "clocks" controlling signal distribution, FIGURE 5 shows the response of the two filters utilised in the application of two particular signals, FIGURE 6 shows the arrangement of said clocks, and FIGURE 7 shows the detailed theoretical diagram of an integrator utilised.

In the drawings like reference numerals designate the same or similar parts.

In the form of embodiment selected and shown in FIGURE 1, the device according to the invention comprises a set 1 of double transducers which supply two items 2 and 3 of information to the clocks 4 adapted for their application thereupon in the form of a single signal to the integrator 5.

According to FIGURE 2, transducers disposed in sets $a$ and $b$, each composed of four stress gauges 6, 7, 8, 9, are mounted on the supports 10, 11, 12, 13 of a plate or platform 14 which is equipped with two rail sections 15.

FIGURE 3 shows eight Wheatstone bridges 16a, 17a, 18a, 19a, 16b, 17b, 18b, 19b, divided into two sets $a$ and $b$. The stress gauges 6 to 9 of the two sets $a$ and $b$ are each disposed in the corresponding bridges 16 to 19.

The two signals supplied by these bridges pass through a junction box 20 and are then fed to the clocks for the distribution of said signals.

FIGURE 4 shows the chronological evolution of the noteworthy instants of the two cycles supplied by said clocks.

$t_0$ represents the starting point of the first cycle which takes over the signal 2, and $t'_0$ the starting point or instant of the second cycle which takes over the signal 3.

$t_1$ and $t_2$ represent the start and end of the integration period of the first signal. $t'_1$ and $t'_2$ represent the start and end of the integration period of the second signal.

$t_3$ indicates the termination of the reading operation.

These instants are distributed in such manner, that:

$$t'_0 - t_0 = t'_1 - t_1 = t'_2 - t_2 = \tau$$

which is the lag between the instants at which the signals 2 and 3 are taken over.

FIGURE 5 illustrates the responses of the filters to two signals whereof the interval, the frequency and phase relative to $t_0$ are such that they produce two identical maximum errors of opposite sign during the integration period of each of the two.

A part of FIGURE 6 shows the arrangement of the clocks—for signal distribution—which are divided into four parallel paths 21, 22, 23, 24.

The track 21 comprises a flip-flop 25 followed by an astable multivibrator 26 adapted to operate a relay 27, said relay 27 comprises two sets of contacts 27a and 27b.

The track 22 comprises a flip-flop 28, then a second flip-flop 29 connected on one side to a multivibrator 30 adapted to operate a relay 31 and on the other side to a voltmeter 54. The relay 31 comprises two sets of contacts 31a and 31b.

The track 23 comprises a flip-flop 32, then a second flip-flop 33 followed by an astable multivibrator 34 adapted to operate a relay 35 equipped with a set of contacts 35a.

The track 24 comprises a flip-flop 36, then a second flip-flop connected on one side to an astable multivibrator 38 adapted to operate a relay 39, and on the other side to an oscillator 45. The relay 39 is equipped with three sets of contacts 39a, 39b, 39c.

FIGURE 6 also illustrates the paths travelled by the signals 2 and 3.

Said signals pass through the corresponding contacts 27a and 31a, and are then applied to filters 40 and 41. The signal 43 issuing from the filter 41 passes through the contacts 35a and then through the contacts 39a. The signal 42 issuing from the filter 40 passes through the contacts 39a. Behind 39a, the mixed signals 42 and 43 form the signal 44 which may be short-circuited by means of the contacts 27b and 31b.

FIGURE 7 shows the consecutive stages of the integrator 5.

The signal 44 is applied to a "splitter" 46 to which an oscillator 45 is also connected. The splitter 46 is connected to an amplifier 48 followed by a transformer 49. A limiter 50 follows said transformer 49 and precedes a double diode accumulator 51 which is moreover connected to the contactor 39b and is followed by a null-balancer 52. Said null-balancer supplies a signal 53 through the contacts 39c to a numerical voltmeter 54 followed by a counter 55 and a printing mechanism 56.

At the instant at which the axle of a truck bears on the platform 14 by crossing over the leading joints of the platform and thereafter rolling along the rail sections 15, a sudden force equivalent to a scale unit is applied to the stress gauges 6, 7, 8, 9 and a shock is generated which causes oscillations which are but slightly damped and of indeterminate phase of said truck body on its suspension springs. According to the individual truck, these oscillations possess a natural frequency which generally lies between two limiting frequencies $f_1$ and $f_2$. In the particular case of trucks loaded to a maximum of 20 tons per axle, the corresponding frequencies are of 5 and 10 c./s.

The resulting signals 2 and 3 supplied by two sets of Wheatstone bridges 16a, 17a, 18a, 19a on the one hand and 16b, 17b, 18b, 19b on the other, are thus composed of a principal signal corresponding to the weight of the axle, and of interference signals of means frequency lying within a known range of frequencies and varying according to the truck axle. These interference signals should be attenuated at least, and balanced out if possible, to ensure that the tension reading occurring during the passage of the axle should not finally be a function of weight alone. It will be noted, that the accuracy of the final measurement will largely depend on the initial ratio between the tension and the weight and on the amplitude of said interference signals.

The two sets of Wheatstone bridges are self-powered and balanced to supply identical signals 2 and 3 transmitted through the junction box 20 to the distribution clocks 4.

In addition to these two signals, an impulse 57 is emitted at the instant the axle passes on to the platform 14. This impulse 57 determines the time $t_0$ starting the first cycle; it controls the four tracks 21, 22, 23, 24 synchronously.

The flip-flop 25 operates for a period $(t_2-t_0)$ during which the astable multivibrator 26 remains in its second state of balance and supplies the coil of the relay 27, thus causing the closure of the contacts 27a which apply the signal 2 to the filter 40, and the opening of the contacts 27b which permit the transmission of the signal 44.

The flip-flop 28 determines the idle period $(t'_0-t_0)$. At the instant $t'_0$, the flip-flop 29 starts and operates for a period $(t'_2-t'_0)$ during which the astable multivibrator 30 remains in its second state of balance and energises the coil of the relay 31, causing the closure of the contacts 31a applying the signal 3 to the filter 41, and the opening of the contacts 31b which maintains the passage of the signal 44 after the instant $t_2$ at which the relay 27 has been de-energised and the contactor 27b closed.

At the instant $t'_2$, the flip-flop 29 moreover supplies a positive impulse which is applied to the numerical voltmeter 54 in order to trigger the reading or recording device.

The flip-flop 32 starts at the instant $t_0$ and lags for a period $(t'_1-t_0)$ before applying a triggering impulse to the flip-flop 33 which determines the time $(t'_2-t'_1)$ during which the astable multivibrator 34 is kept in the second position of balance, feeding the relay 35, which causes the contacts 35a to close during the integration period $(t'_2-t'_1)$ corresponding to the second cycle.

The flip-flop 36 lags for a period $(t_1-t_0)$ and at the instant $t_1$ applies a triggering impulse to the flip-flop 37 which from the instant $t_1$ to the instant $t_3$ keeps the astable multivibrator 38 in operation, which feeds the relay 39. The contacts 39a are thus closed from $t_1$ to $t_3$ and the signal 44 is effectively transmitted to the following stages from $t_1$ to $t'_2$. The contacts 39b open and intervene in a manner which is further to be specified in the operation of the double diode accumulator 51. Analogously, by its opening from $t_1$ to $t_3$, the contacts 39c permit the application of the signal 53 to the voltmeter 54; in addition, from the instant $t_1$ to the instant $t_3$ the multivibrator 37 permits the operation of the oscillator 45.

As hereinabove specified, the contacts 27a and 31a apply the signals 2 and 3 to the corresponding filters 40 and 41.

These two filters 40 and 41 are identical. These are second order low-pass filters calibrated close to critical damping. In order to obtain a minimum of error, the natural frequency of these filters is determined by a calculation which takes three parameters into account: the minimum frequency of the disturbances $f_1$, the period of existence of the signal and the ratio between the amplitudes of the useful signal and interference signal. The transient nature of the signal involves the need for a reading or indication instant closely following upon the instant of application of the signal at the input of the filter. The interference signal having an uncertain phase in relation to its instant of application to the filter, creates in the filter a transitory state of indeterminate initial amplitude decreasing exponentially and of which the duration is inversely proportional to the natural frequency of the filter. The attenuation of the interference signal having the frequency $f$, which is also inversely proportional to the natural frequency of the filter, should however be adequate, even in the case in which said frequency $f$ is a minimum. There exists an optimum natural frequency for the filter, which is determined by said calculation.

By way of example, for a minimum frequency $f_1=5$ c./s., a period of signal existence of 0.7 second and a ratio of 10 between the amplitudes of the useful and interference signals, the optimum natural pulsation of the filter is equal to 12.

As far as the transitory state created in the filters by the application of the principal signal is concerned, it is not necessary to await its termination to perform the measurement. Since the instants of application and of measurement being separated by a constant interval, it is sufficient to take this constant transmission coefficient into account.

On issuing from the filter 40, the signal 42 obtained is applied to the integrator 5 for the period $(t_2-t_1)$. As has hereinabove been stated, this period is determined by the closing of the contacts 39a at the instant $t_1$ on the one hand, and by the opening of the contacts 27a at the instant $t_2$ on the other.

Analogously, on issuing from the filter 41, the signal 43 obtained is applied to the integrator 5 during the period $(t'_2-t'_1)$ which is directly determined by the closing and opening of the contacts 35a.

At the instant $t'_2$, the closing of the contacts 31b mounted in series with the contacts 27b already closed since the instant $t_2$, earths the inlet of the integrator 5.

A signal 44 is thus fed to the integrator 5 from the instant $t_1$ to the instant $t'_2$; that is to say the signal 42 alone from $t_1$ to $t'_1$, the two signals 42 and 43 together from $t'_1$ to $t_2$, and the signal 43 alone from $t_2$ to $t'_2$.

The duration of these different integration periods is directly selected as a function of the minimum probable frequency $f_1$ of the interference signal.

$(t_2-t_1)$ and $(t'_2-t'_1)$ are thus selected very close to the period of $f_1$.

In the case of the signals shown in FIGURE 5, the interference frequency is $f=1.5 f_1 \#1.5 (t_2-t_1)$ the signal shown in FIGURE 5a (signal 42) has a negative maximum amplitude at the instant $t_0$, whereas the signal shown in FIGURE 5b (signal 43) has a positive maximum amplitude at the instant $t'_0$ since the interval $\tau$ between these two signals is selected equal to ⅓ $(t_2-t_1)$ or, a half-cycle. Moreover, the difference $(t_1-t_0)$ is assumed to be such, that the phases of the signal 42 at the instant $t_1$ and of the signal 43 at the instant $t'_1$ are nil. By integrating the signal 42 only during the period $(t_2-t_1)$ one obtains a maximum positive error since the initial amplitude of the transitory signal is maximum and positive, and since the signal having the frequency $f$ amounts to three semi-alternations of which two are positive and one negative, during the integration period. By integrating the signal 43 between the instants $t'_1$ and $t'_2$, one obtains a maximum negative error for reasons similar to those of the preceding case.

By utilising one and the same integrator for both signals and thus adding the two results above, one obtains an error which is nil theoretically. In FIGURE 5, the sum of the hatched areas which corresponds to the integral of the responses, in effect yields a mean value equal to nil between $t_1$ and $t'_2$.

This cancellation remains in being for all the relative phase conditions of the interference signal at the frequency $f$ and at the starting instants of the phases, $t_0$ and $t'_0$. In effect, the total integration period $(t'_2-t_1)$ precisely equals two cycles of the signal having the frequency $f$, which results in a mean value equal to nought, and the interval between the instants $t_0$ and $t'_0$ is equal to a half-cycle, which results in two equal transitory signals of opposite sign. For the signals of a frequency differing from $f$, the addition of the maximum errors corresponding to each of the signals 42 and 43 results in a lower absolute value than that of either.

In general manner, the mean error is distinctly reduced as compared to the case of the integration of a single signal.

By way of example, the results hereinafter defined have been obtained on the basis of the following data:

Period of passage of each axle over the weighbridge longer than or equal to 0.7 second,
Static weight of each axle lower than or equal to 20 tons, applied suddenly to said platform and comparable to a scale unit,
Weight affected by oscillatory disturbances of uncertain phase, of a frequency lying between 5 and 10 c./s. and of an amplitude lower than or equal to ⅒ of the standard unit,
Natural pulsation of the filter=12,
Interval between cycles=74 milliseconds,
Period of integration of each signal:

$$(t_2-t_1)=t'_2-t'_1=0.2 \text{ second.}$$

In these conditions, the maximum error is of the order of ±0.35 per thousand of true weight.

With these same theories relating to the signals which are to be measured, but utilising one cycle only and the optimum natural frequency of the filter being equal to 10, the error is of ±1.4 per thousand of true weight, or four times greater.

The device according to the invention is thus of considerable interest.

No detailed specification of the nature of the integrator 5 has been given in the preceding statement describing the operation of the device according to the invention. A preferred form of construction of said integrator will hereinafter be described.

The contacts 39a being closed, at least one of the contacts 27b and 31b being open between $t_1$ and $t'_2$, and the relay 35 being in operation from $t'_1$ to $t'_2$, the signal 44 is applied to the integrator 5 (FIGURES 1 and 7) from $t_1$ to $t'_2$.

Between the instants $t_1$ and $t_3$, the oscillator 45 is in operation and controls the splitter 46. The latter is an electro-mechanical synchronous vibrator or else a balanced modulator comprising diodes or transistors, of known type. The signal 44 is decoupled in the rhythm of the frequency of the oscillator 45 and appears at 47 in the form of an amplitude modulated alternating signal. A stable regeneration amplifier 48, followed by a transformer 49 converts the signal 47 to an appropriate amplitude by multiplying it by a constant gain. In order to obtain, to an approximate factor, the integration of the signal 44 between $t_1$ and $t'_2$, it is sufficient to obtain the sum of the positive alternations of the signal supplied by the transformer 49. This is the purpose of the three stages 50, 51, 52.

The stage 50 is a limiter customarily formed by a detection diode polarised by means of a stabilised voltage having the value $E_0$.

The stage 51 is a network known by the name of double diode accumulator, comprising in particular a capacitor followed by a cathodic connection stage in order to increase the maximum amplitude of the output voltage whilst retaining the relative natural error of the accumulator, and adapted to produce to an approximate factor and with satisfactory linearity, the summation of the consecutive pulsations fed to it by the preceding stage, and to supply said summation to the stage following it, with a low output impedance.

In order to correct the permanent voltage at the output which exists even if the signal supplied by the transformer 49 is nil, a compensating stage 52 mainly consisting of a source of stabilised voltage may be utilized.

After said compensation, the signal 53 obtained appears in the form of a direct voltage, solely as a function of the voltage analogous to the weight supplied by the transducers.

At the instant $t'_2$, the input of the splitter 46 is short-circuited as hereinabove apparent.

The charge of the double diode accumulator 51 does not increase any further and the signal 53 thus remains constant, until the instant $t_3$ at which the contacts $39b$ close, resetting the accumulator 51 to zero by short-circuiting the capacitor.

Moreover, at the instant $t'_2$, a positive impulse supplied by the inversion of the flip-flop 29 triggers the numerical voltmeter 54 which indicates the voltage 53 between $t'_2$ and $t_3$.

The information supplied by the numerical voltmeter 54 is stored in a counter 55 in coded form.

Each truck axle passing over the device thus provides a stored item of information. The addition of these items per truck, thus gives the total weight of the truck. The impulse for the summation of the stored items of information is triggered by a photoelectric cell 58 obscured during the passage of the truck and uncovered after its passage. Each result of addition is decoded and then fed to the recording or printing mechanism 56 which records the weight of the truck on a roll of paper in uncoded numerals.

It will be apparent that the invention is not limited to the form of embodiment selected and illustrated, which is given by way of example only, but may on the contrary form the object of various modifications within the scope of the invention.

Firstly, the physical values to be measured may be of quite different nature from the weights envisaged in this case, as may be the nature of the analogous data supplied by the transducers. The stress gauges utilised in this case may thus be replaced by springs, counter-weights, pressure gauges, thermometers, flow-meters, which supply analogous data of mechanical, pneumatic or electrical nature.

As far as the clock or timing mechanisms to be utilised are concerned, these may be mechanical, electrical or electronic. In the last case, all types of time-base known in electronics may be provided, possibly in substitution for the flip-flops hereinbefore referred to.

Depending on the nature of the analogous information selected, the low-pass filters may comprise counter-weights, springs and viscous damping means if the information is of mechanical nature, condensers, inductances and resistances if the information is of electrical nature, and utilising a given gas flowing in pipes which in particular comprise throttling or constriction points and expansion spaces, if the information is of pneumatic nature.

The nature of the relays for the distribution of data depends on the actual nature of said data. Data of mechanical nature thus leads to the utilisation of clutches, being magnetic clutches in particular, whereas in the case of pneumatic data electro-magnetic valves will be utilised. In addition, in the case of electrical data, the electro-mechanical relays provided for in this case, may in certain instances be replaced to advantage by unit gain electronic amplifiers which moreover possess a blocking electrode.

Concerning the integrator, referring to the case of electrical data, it has hereinabove been stated, that in general fashion, all types of integrator could contingently be appropriate depending on the accuracy required: capacity feedback D.C. amplifiers, tachymetric feedback servo-mechanisms apt to perform direct summation of several consecutive measurements, as well as their indication or recording, or else linear amplitude-frequency converters followed by an impulse counter directly controlled by the relays distributing data.

Various types of integrators are known in the case of mechanical data, referring in particular to the mechanism described as a "potter's wheel."

In addition, it is frequently possible by means of linear potentiometers or digital coders for example, to convert an item of mechanical or pneumatic information into electrical data occasionally more convenient to process, which leads to the construction of mixed devices, combining the advantages of each type of data.

We claim:

1. A device for the measurement of a transitory value affected by oscillatory disturbances of appreciable amplitude and of a mean frequency lying within a known frequency range but of uncertain phase, the device comprising in combination a plurality of transducers, first and second series of timing mechanisms, first and second low-pass filters, an integrator and an indicating instrument, the transducers being arranged in two sets for converting the transitory value into two initial and identical items of information, each said item of information being formed of a principal signal analogous to said value and an interference signal, the first series of timing mechanisms being arranged to apply one of the said items of information to the first low-pass filter wherein the principal signal is attenuated so that the output signal from the said first low-pass filter is comprised by the interference signal, means for applying the output signal from the first low-pass filter to the integrator during an integration period equal to the period of the interference signal of the minimum probable frequency, the second series of timing mechanisms being arranged to apply the other of the said items of information to the second low-pass filter at a later instant of time than the time at which the first series of timing mechanisms applies the said one item of information to the first low-pass filter, the time lag being a period equal to about one-third of the integration period, the second low-pass filter acting on the said other item of information in a similar manner to the action of the first low-pass filter on the said one item of information, means for applying the output from the second low-pass filter to the integrator for the said integration period, the integrator being adapted to combine the two signals during their integration in the said integration period and to supply a measurement value to an indicating instrument.

2. A device according to claim 1 wherein the transducers are adapted to produce the two items of information in an electrical form and the said first and second timing mechanisms are each comprised by a flip-flop, an astable multivibrator connected to the flip-flop, and a distribution relay arranged to be operated by the astable multivibrator.

3. A device according to claim 1 wherein the first and second low-pass filters are each second order filters calibrated close to critical damping.

4. A device according to claim 1 wherein the means for applying the output signal from the respective low-pass filters to the integrator includes a modulator to which the output signals are supplied and a stabilised gain amplifier of the carrier current type, connected to the modulator.

5. A device according to claim 1 wherein the integrator comprises a threshold type of detector, a double diode accumulator of the cathodic connection type connected to the detector, and a null-type compensator connected to the double diode accumulator.

6. A device according to claim 1 wherein the indicating instrument is an indicating voltmeter which gives a numerical reading.

7. A device according to claim 1 wherein the transitory value is a measurement of the weight of the axles of railway trucks in motion and wherein the transducers are bridges of stress gauges secured to the supports of a weighbridge platform having rail sections over which the said trucks run.

8. A device according to claim 7 wherein the indicating instrument is an indicating voltmeter of the numerical type, the device further comprising a photoelectric cell, a source of light adapted to illuminate the photoelectric cell and arranged such that the luminous beam will be interrupted by the passage of a truck over the weighbridge, a counter connected to the output of the numerical indicating voltmeter, and a recording instrument connected to the counter.

No references cited.